United States Patent
Paspek et al.

(10) Patent No.: US 10,538,703 B2
(45) Date of Patent: Jan. 21, 2020

(54) SOIL AMENDMENT WITH CARPET ADHESIVE GRANULES

(71) Applicant: Broadview Group International, LLC, Brook Park, OH (US)

(72) Inventors: Stephen Carl Paspek, Broadview Heights, OH (US); Joseph Edward Bork, Westlake, OH (US); Alan Fredrick Schroeder, Cleveland, OH (US)

(73) Assignee: BROADVIEW GROUP INTERNATIONAL, LLC, Brook Park, OH (US)

( * ) Notice: Subject to any disclaimer, the term of this patent is extended or adjusted under 35 U.S.C. 154(b) by 0 days.

(21) Appl. No.: 16/130,972

(22) Filed: Sep. 13, 2018

(65) Prior Publication Data

US 2019/0078018 A1 Mar. 14, 2019

Related U.S. Application Data

(60) Provisional application No. 62/557,805, filed on Sep. 13, 2017.

(51) Int. Cl.
| | |
|---|---|
| C09K 17/48 | (2006.01) |
| B29B 9/06 | (2006.01) |
| C05G 3/00 | (2006.01) |
| C05G 3/04 | (2006.01) |
| C05D 3/02 | (2006.01) |
| B29B 17/04 | (2006.01) |
| B29K 105/26 | (2006.01) |
| B29L 31/00 | (2006.01) |
| C08J 11/08 | (2006.01) |
| B29B 17/02 | (2006.01) |

(52) U.S. Cl.
CPC ............... *C09K 17/48* (2013.01); *B29B 9/06* (2013.01); *C05D 3/02* (2013.01); *C05G 3/0058* (2013.01); *C05G 3/04* (2013.01); *B29B 2017/0224* (2013.01); *B29B 2017/0488* (2013.01); *B29K 2105/26* (2013.01); *B29L 2031/7322* (2013.01); *C08J 11/08* (2013.01)

(58) Field of Classification Search
CPC ..... B29L 2031/7322; B29B 2017/0224; B29B 17/0412; B29B 2017/0488; B29B 9/06; B29K 2105/26; Y02W 30/622; Y02W 30/667; C08J 11/08; C09K 17/48
See application file for complete search history.

(56) References Cited

U.S. PATENT DOCUMENTS

| | | | | |
|---|---|---|---|---|
| 6,029,916 A | * | 2/2000 | White | B03B 9/061 |
| | | | | 241/24.19 |
| 2009/0050720 A1 | * | 2/2009 | Kikuchi | B02C 13/04 |
| | | | | 241/24.1 |
| 2016/0222292 A1 | * | 8/2016 | Shvarzman | E02D 3/02 |
| 2017/0044076 A1 | * | 2/2017 | Waters | C05D 3/02 |

* cited by examiner

*Primary Examiner* — Carib A Oquendo
(74) *Attorney, Agent, or Firm* — Wentsler LLC

(57) ABSTRACT

Methods of amending soil to improve porosity and reduce compaction are provided. The method includes providing a carpet product. The method further includes separating the carpet product into fiber and granules. The method also includes adding the granules to the soil. The method can also include impacting the carpet product with a rotary impact separator. The method can also include impacting the carpet product with a hammer mill.

20 Claims, 3 Drawing Sheets

SOIL AMENDMENT WITH CARPET ADHESIVE GRANULES

CROSS-REFERENCE TO RELATED APPLICATIONS

This application claims the benefit of priority of U.S. Provisional Patent Application No. 62/557,805, titled "SOIL AMENDMENT WITH CARPET ADHESIVE GRANULES," filed on Sep. 13, 2017, the entire disclosure of which is hereby incorporated by reference.

FIELD

The present disclosure relates generally to a soil amendment material derived from recycled carpeting. More particularly, this application relates to a modification of the soil properties to improve porosity, increase the movement of air and water through the soil, and to promote drainage. Additionally, this application relates to the softening of compacted soils, improving footing, reducing impact injury, and improving safety.

BACKGROUND

Soils are susceptible to compaction for many reasons. It may be due to a poor particle size distribution (i.e. poor structure), a high clay content, a lack of organic matter, or other natural phenomena. It may be due to mechanical compaction such as that from athletes or livestock or heavy equipment.

Compacted soils tend to have poor drainage and become very hard when dry. In an arena without grass, this leads to impact and stress injuries and poor footing. In turf areas, in addition to the above, root growth may be inhibited, leading to stressed grasses, loss of vigor, and poor appearance. In both cases, a hard surface is substantially less safe than a resilient surface.

Previous attempts to address this problem have included incorporating a variety of soil amendments to alter the particle size distribution and the cohesiveness of the soil. These amendments include organic matter such as peat moss, saw dust, and straw, and synthetic materials such as rubber crumb derived from used tires and chopped athletic shoes.

Natural materials such as garden lime (actually powdered limestone) and gypsum (calcium sulfate) have also been used, but are largely ineffective in most cases, simply adding to the burden of too many fine particles. Sand has been used and has a particle size significantly larger than clay. However, unless a very large amount of sand is added, the clay tends to encapsulate the sand leading to minimal improvements in porosity.

SUMMARY

The following presents a simplified summary of the disclosure to provide a basic understanding of some embodiments described in the detailed description.

In accordance with some embodiments, a method of amending soil to improve porosity and reduce compaction is provided. The method comprises providing a carpet product. The method further comprises separating the carpet product into fiber and granules. The method further comprises adding the granules to the soil.

In accordance with some embodiments, a method of amending soil to improve porosity and reduce compaction. The method comprises providing a carpet product. The method further comprises impacting the carpet product with a hammer mill. The method further comprises, after impacting the carpet product, delivering the carpet product to a screen. The method further comprises separating the carpet product into fiber and granules. The method further comprises adding the granules to the soil.

In accordance with some embodiments, a method of amending soil to improve porosity and reduce compaction. The method comprises providing a carpet product. The method further comprises impacting the carpet product with a rotary impact separator. The method comprises, after impacting the carpet product, separating the carpet product into fiber and granules. The method comprises adding the granules to the soil.

BRIEF DESCRIPTION OF THE DRAWINGS

These and other features, embodiments and advantages are better understood when the following detailed description is read with reference to the accompanying drawings, in which.

DETAILED DESCRIPTION

Figure 1:
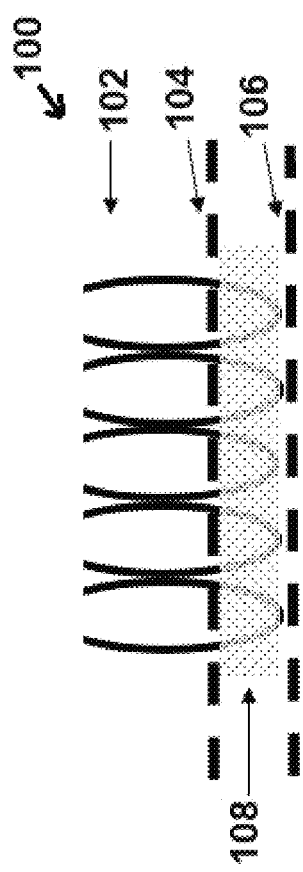
FIG. 1 schematically illustrates a cross-section of carpet in accordance with embodiments of the disclosure.

Embodiments will now be described more fully hereinafter with reference to the accompanying drawings in which embodiments are shown. Whenever possible, the same reference numerals are used throughout the drawings to refer to the same or like parts. However, this disclosure may be embodied in many different forms and should not be construed as limited to the embodiments set forth herein.

Referring to FIG. 1, in some embodiments, a carpet 100 can be provided. The carpet 100 can comprise broadloom carpet, a post consumer and/or post industrial carpet, etc. The carpet 100 comprises a face fiber 102 that can be attached to a primary backing 104. In some embodiments, the face fiber 102 can be attached to the primary backing 104 by an adhesive 108. The adhesive 108 can comprise a mixture of an organic latex such as styrene butadiene rubber (SBR) or ethylene vinyl acetate (EVA) and an inorganic powder. To provide proper weight and the proper viscosity for facile carpet manufacture, the inorganic powder may comprise ground limestone—predominantly calcium and magnesium carbonates, with a particle size of roughly 0.1 to 10 microns.

In some embodiments, the carpet 100 comprises a secondary backing 106. The primary backing 104 and/or the face fibers 102 can be attached to the secondary backing 106 by the adhesive 108. The secondary backing 106 and the adhesive 108 can be disposed on one side of the primary backing 104 (e.g., a lower side of the primary backing 104), while a portion of the face fibers 102 can be positioned on an opposite side of the primary backing 104.

Figure 2:
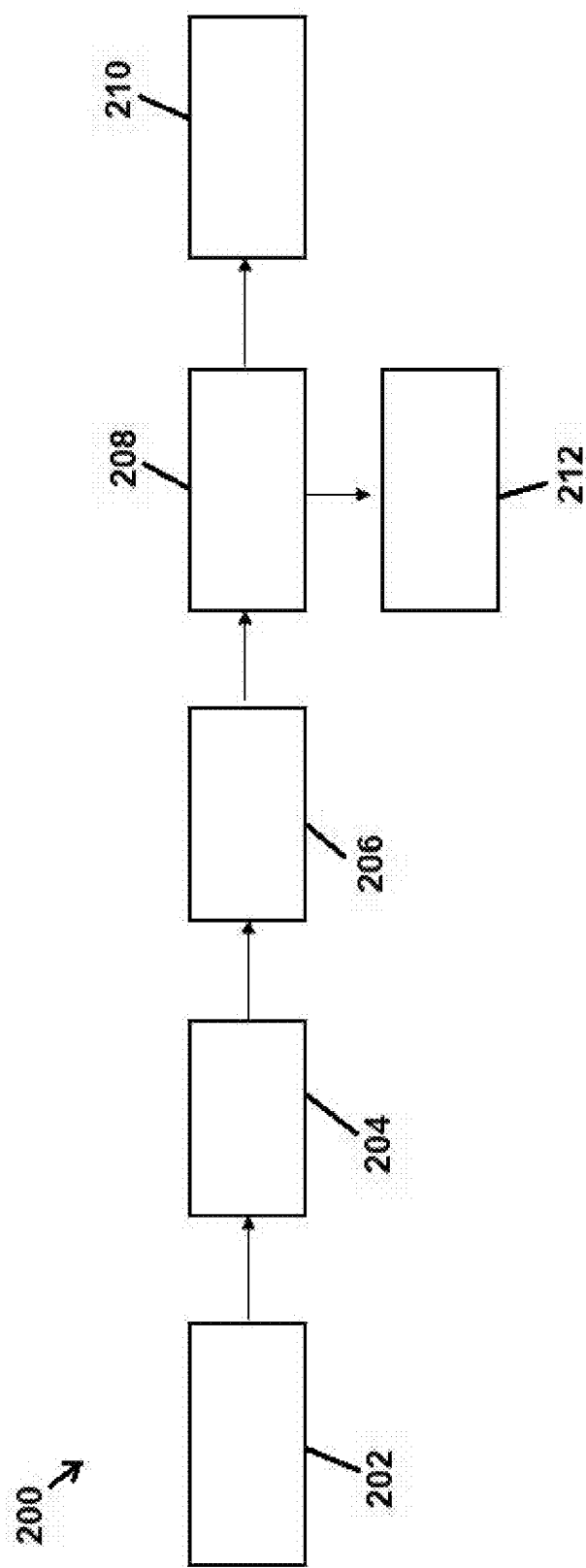
FIG. 2 schematically illustrates a method of amending soil to improve porosity and reduce compaction in accordance with embodiments of the disclosure.

Referring to FIG. 2, a method 200 of amending soil to improve porosity and reduce compaction is provided. In some embodiments, the method 200 comprises providing the carpet 202 (e.g., the carpet 100 of FIG. 1). The method 200 comprises shredding 204 the carpet 100. The carpet 100 can be shredded in any number of ways, such as with mechanical shredding tools or the like. By shredding the carpet 100, the carpet 100 can be reduced to smaller portions. In some embodiments, the method 200 comprises impacting the carpet with a hammer mill 206. The hammer mill is an impact device that can provide an impact to the carpet 100. The hammer mill 206 can comprise, for example, one or more hammers or other blunt force instruments. By impacting the carpet 100 with the hammer mill 206, carpet 100 can be broken down into one or more sub-products. For example, impacting the carpet 100 with the hammer mill 206 can cause the adhesive 108 to be removed from the face fiber 102. The adhesive 108 can further be broken down into a granular form due to the impact from the hammer mill 206.

After the carpet 100 has been impacted with the hammer mill 206, the carpet 100 (e.g., by-products of the carpet 100) can be delivered to a screen (e.g., between 206 and 208). The method 200 can comprise screening the carpet 100. For example, by screening the carpet 100, the carpet 100 can be separated into fiber 210 and granules 212. In some embodiments, the screen can comprise one or more openings. The openings in the screen can be sized to allow for the granules 212 to pass through while limiting the fiber 210 from passing through. In this way, the step of screening 208 can function to separate the fiber 210 from the granules 212.

In some embodiments, after the fiber 210 has been separated by the granules 212, the method 200 can comprise screening the granules 212 to remove 50% or move of the granules having a size that is less than about 100 microns. For example, the granules 212 can be screened, wherein the screen can have openings that selective allow for granules of a certain size or smaller to pass through. In this way, granules having a smaller size (e.g., a size less than about 100 microns) can pass through the openings in the screen, while larger sized granules may be limited from passing through the screen. As such, the step of screening can remove some of the granules 212 having a larger size.

In some embodiments, after the granules 212 have been separated, the granules 212 can be added to the soil. The soil may be a part of, for example, one or more of an arena, a track, a show grounds, or a field. The granules 212 can be added to an area which is one or more of existing turf, or an area that may be seeded to grow turf. The granules 212 can comprise between about 0.1 percent to about 50 volume percent of the amended soil mixture.

Figure 3:
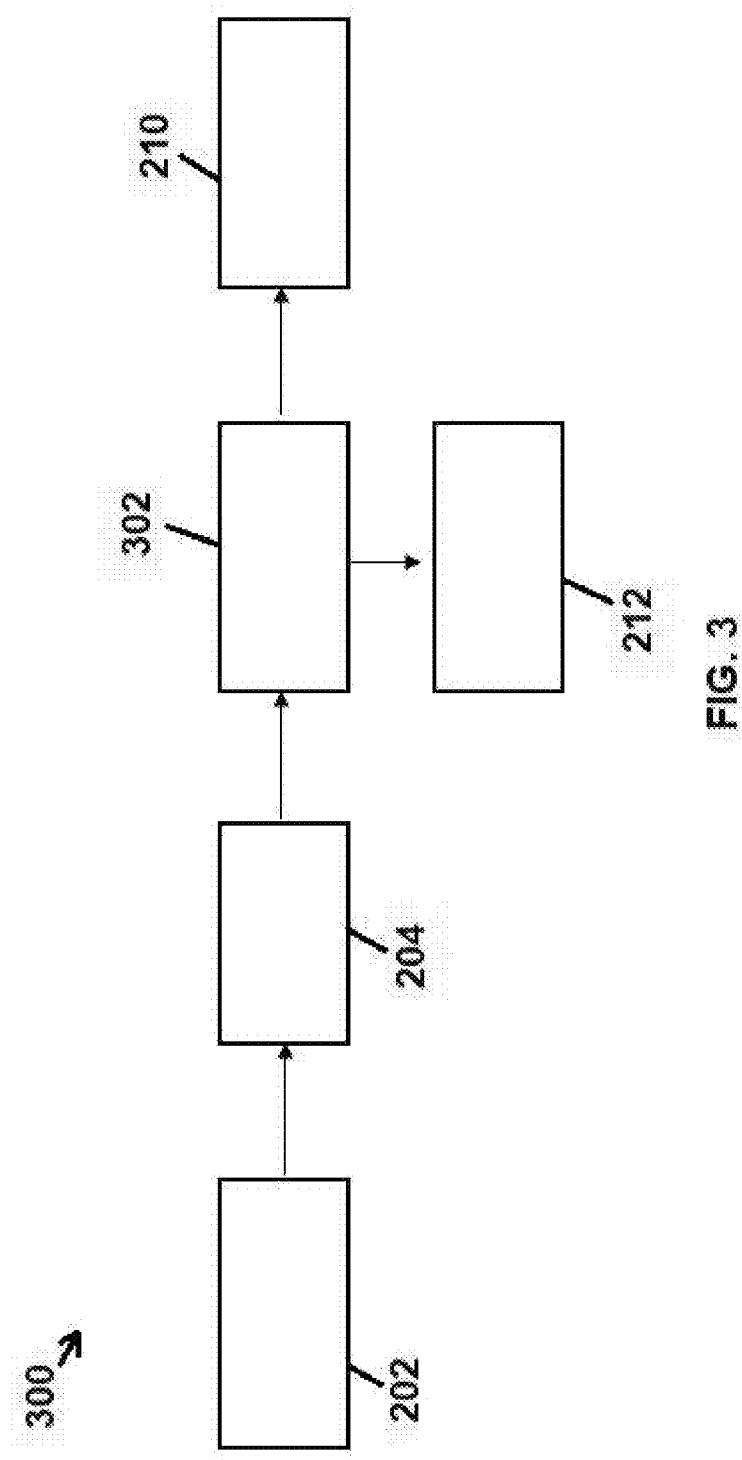
FIG. 3 illustrates a method of amending soil to improve porosity and reduce compaction in accordance with embodiments of the disclosure.

Referring to FIG. 3, another example method 300 of amending soil to improve porosity and reduce compaction is provided. In some embodiments, the method 300 comprises providing the carpet 202 (e.g., the carpet 100 of FIG. 1). The method 300 comprises shredding 204 the carpet 100. The carpet 100 can be shredded in any number of ways, such as with mechanical shredding tools or the like. By shredding the carpet 100, the carpet 100 can be reduced to smaller portions. In some embodiments, the method 300 comprises impacting the carpet with a rotary impact separator 302. The rotary impact separator 302 is an impact device that can provide an impact to the carpet 100. The rotary impact separator 302 can comprise a machine with a housing and a shaft having one or more blunt force instruments therein. As the carpet 100 enters the rotary impact separator 302, the carpet 100 can be impacted, whereupon the carpet 100 can be broken down into one or more sub-products. For example, impacting the carpet 100 with the rotary impact separator 302 can cause the adhesive 108 to be removed from the face fiber 102. The adhesive 108 can further be broken down into a granular form due to the impact from the rotary impact separator 302.

In some embodiments, after the carpet 100 has been impacted with the rotary impact separator 302, the carpet 100 (e.g., by-products of the carpet 100) can be screened. For example, the rotary impact separator 302 can comprise a screen that can function to separate the carpet 100 into byproducts. For example, by screening the carpet 100, the carpet 100 can be separated into fiber 210 and granules 212. In this way, the step of screening can function to separate the fiber 210 from the granules 212.

In some embodiments, after the fiber 210 has been separated by the granules 212, the method 300 can comprise screening the granules 212 to remove 50% or more of the granules having a size that is less than about 100 microns. For example, the granules 212 can be screened, wherein the screen can have openings that selective allow for granules of a certain size or smaller to pass through. In this way, granules having a smaller size (e.g., a size less than about 100 microns) can pass through the openings in the screen, while larger sized granules may be limited from passing through the screen. As such, the step of screening can remove some of the granules 212 having a larger size.

In some embodiments, after the granules 212 have been separated, the granules 212 can be added to the soil. The soil may be a part of, for example, one or more of an arena, a track, a show grounds, or a field. The granules 212 can be added to an area which is one or more of existing turf, or an area that may be seeded to grow turf. The granules 212 can comprise between about 0.1 percent to about 50 volume percent of the amended soil mixture.

This application provides a material that can be added to or incorporated into an area with compacted soil to improve porosity, improve drainage, and increase the safety of the area for both humans and livestock. The material can be derived from the recycling of post industrial or post consumer carpet.

In the recycling of carpet, the adhesive can be removed from the polymer strands to provide a more valuable polymer stream. In general, the polymers are recovered in fiber form, while the adhesive is reduced to a granular form. This is often achieved by some type of impact device such as a hammer mill, followed by some type of screening device such as a trommel screen or a vibrating screen or a fiber condenser. Alternatively, a Rotary Impact Separator could be used to simultaneously disassemble the carpet and separate the adhesive granules from the fiber. This rotary impact separator was described in U.S. provisional patent application 62/325,017 and U.S. non-provisional patent application Ser. No. 15/350,340, which is hereby incorporated by reference.

The adhesive granules thus generated can be described as an organic elastomeric matrix filled with finely powdered limestone. A typical granule particle size distribution ranges from sub-micron up to about 5 millimeters, with the average particle size in the range of 0.1 to 3 millimeters.

As with any recycle operation, separations are not perfect. The carpet adhesive granules can contain up to 10 wt % fiber from the carpet. Typically, these fibers are very fine, short fibers that were too small to be captured by the screening means and report to the adhesive granules stream.

The addition of these carpet adhesive granules to a dense or compacted soil provides a number of unexpected benefits, including increased porosity, improved footing, and an overall safer surface. In the case of turf-covered surfaces, it also provides improved root development of grasses. Further, the micro-porous organic phase provides a slow release of calcium and magnesium into the surround soil matrix, helping to provide essential nutrients and buffering the connate water to maintain proper pH. Finally, the micro fibers associated with the carpet adhesive granules help to stabilize soils, preventing erosion and help maintain porosity under conditions of mechanical compression.

Carpet Adhesive Granules can be used in a number of ways, including but not limited to:

Dry or wet (slurry) application of Carpet Adhesive Granules to an field or arena, followed by mixing into the existing soil by some cultivation means Dry or wet (slurry) application of Carpet Adhesive Granules to a field or track area, followed by mixing into the existing soil by some cultivation means prior to applying seed Co-application of a mixture of Carpet Adhesive Granules and Fertilizer to an area, followed by mixing into the existing soil by some cultivation means prior to applying seed Co-application of Carpet Adhesive Granules with grass seed to a prepared field area Application of a mixture of Carpet Adhesive Granules, fertilizer, and grass seed to an area, optionally with the addition of other minerals and chemicals necessary for good turf growth.

Dry application of Carpet Adhesive Granules to an existing turf-covered area to improve drainage and to encourage root growth Wet application as a slurry to an existing turf covered area or bare dirt, optionally with an added surfactant to aid in wetting.

Carpet Adhesive Granules can also function as a carrier for various chemical agents that need to be applied to an area. This includes various herbicides, fungicides, mineral supplements, humectants, surfactants, and pH balancing chemicals. The Carpet Adhesive Granules are pretreated with one or more of the above categories of supplements and then applied to either bare dirt or existing turf.

In some embodiments, the carpet Adhesive Granules are able to absorb both polar and non-polar liquids, e.g., both aqueous and organic liquids. This makes them ideal carriers for a variety of beneficial chemicals.

Carpet Adhesive Granules are markedly different from other soil amendment materials such as crushed limestone, crumb rubber, latex rubber, or other pure elastomers. Carpet Adhesive Granules are a mixture of about 60 to 80 percent limestone encapsulated in an elastomeric matrix. As such, it has physical and chemical properties that are substantially different from either the pure elastomer or the pure filler. For example, limestone is rigid and friable and breaks into smaller particles under mechanical compression, whereas the Carpet Adhesive Granule is flexible and resilient. This prevents premature break-down of the soil amendment and minimizes dusting.

Crumb rubber, derived from recycled tires and latex rubber both lack the high levels of limestone found in Carpet Adhesive Granules. This causes them to have different mechanical and chemical properties. The pure elastomeric materials themselves (SBR or EVA) also lack the filler component, and lack the mechanical strength that is found in Carpet Adhesive Granules. The resultant soil would be too soft, and could not tolerate mechanical compression.

The permanence and endurance of Carpet Adhesive Granules set it apart from natural materials currently used to reduce surface hardness on tracks and arena areas such as saw dust, wood shavings, straw, dried grass, and manure. These materials are quickly attacked by microorganisms and broken down. In addition to loosing efficacy, they also create dust which can lead to severe pulmonary problems with human, canine, and equine participants.

An object of this application is to provide a material that can improve the porosity, the consistency, the stability, and the chemistry of compacted soils, soils with poor particle size distributions, or poor chemistry. In doing so, it also reduces the probability of and severity of impact injuries to athletes and animals.

We have found that Carpet Adhesive Granules are useful in arenas that have been previously treated with various amendments and softening agents that have lost their efficacy. Instead of removing and replacing the offending surface, an amendment with Carpet Adhesive Granules can restore the vitality and resilience of such a distressed surface.

Compacted soils are usually characterized by a preponderance of material with a very fine grain structure that packs together quite tightly. This inhibits the movement of air, water and ions. It can be slippery when wet, very hard when dry, and generates dust when disturbed.

Carpet Adhesive Granules are made from a heavily-filled elastomeric material that provides micro-porosity to compacted soils. They are soft and elastic enough to minimize impact injuries, but rigid enough to provide good footing and minimal shear.

The dosage of Carpet Adhesive Granules depends on the specifics of a particular site and the purpose for which the soil is being amended. For example, a dressage arena typically comprises 3-4 inches of a sand and clay top surface over an impermeable base. Amending such an area may require 0.25 to 2 inches of Carpet Adhesive Granules, followed by tilling to thoroughly mix the Carpet Adhesive Granules with the existing top surface.

A field being prepared as a paddock or an athletic field may require 0.25 to 4 inches of Carpet Adhesive Granules depending on the type of soil, the expected weather, and the underlying drainage. The Carpet Adhesive Granules can be applied to the surface and then worked into the top 3 to 6 inches of soil by any cultivation means. The entire application may be made at one time, although it may be easier to break large applications into several batches to facilitate mixing.

An existing turf field may benefit from top dressing with Carpet Adhesive Granules in a manner similar to sand top dressing. Typically, a layer of no more than approximately ¼ inch is applied to avoid burying the grass too deeply. The Carpet Adhesive Granules will slowly work it way into the soil, especially after a watering or rain, loosening up the compacted material. As the original material is incorporated, additional layers can be applied. The Carpet Adhesive Granules can be applied as a dry powder, or as an aqueous slurry. A technique known as "plugging" (i.e. the removal of small plugs of soil and turf) can be used before or after the application of Carpet Adhesive Granules to a turf field to promote the movement of the granules into the root zone.

Compared to sand top dressing, the Carpet Adhesive Granules provide increased aeration and percolation since the granules themselves are micro-porous, whereas the sand grains are not. Further, the slow leaching of calcium and magnesium from the Carpet Adhesive Granules provides essential minerals and pH control, functions that silica sand cannot perform.

Unlike sand, Carpet Adhesive Granules contain less than 1 wt % silica, a substance known to cause lung problems in humans and animals.

SPECIFIC EXAMPLES

Example 1

Prior attempts have included:
An arena floor that comprised clay was extremely hard and compacted.
A sample of arena floor material was mixed with sand in the ratio of 2 parts by weight arena floor material to 1 part by weight sand. The product was a gritty mass of clay. It showed no softening, and no increase in porosity.

Example 2

Prior attempts have included:
An arena floor that comprised clay was extremely hard and compacted.
A sample of arena floor material was mixed with pulverized limestone in the ratio of 2 parts by weight arena floor material to 1 part by weight limestone. The product was a gritty mass of clay. It showed no softening, and no increase in porosity.

Example 3

The rest of the examples do practice the method disclosed herein.
An arena floor that comprised clay was extremely hard and compacted.
A sample of arena floor material was mixed with Carpet Adhesive Granules in the ratio of 2 parts by weight arena floor material to 1 part by weight Carpet Adhesive Granules.
The resultant product was a uniform, granular, free-flowing powder with excellent footing characteristics.

Example 4

An arena floor that comprised clay was extremely hard and compacted.
A sample of arena floor material was mixed with Carpet Adhesive Granules in the ratio of 10 parts by weight arena floor material to 3 parts by weight Carpet Adhesive Granules.
The resultant product was a uniform, granular, free-flowing powder with excellent characteristics.

Example 5

An arena floor that comprised clay was extremely hard and compacted.
Carpet Adhesive Granules were pretreated with 0.5 wt % of a cationic surfactant.
A sample of arena floor material was mixed with Carpet Adhesive Granules in the ratio of 10 parts by weight arena floor material to 3 parts by weight Carpet Adhesive Granules.
The resultant product was a uniform, granular, free-flowing powder with excellent characteristics. With the inclusion of the surfactant, the mixing of the arena floor material with the carpet adhesive granules was much faster and easier. Furthermore, the surfactant helps to promote water penetration during subsequent use and watering of the arena, and helps to minimize dusting.

Example 6

Carpet Adhesive Granules were pretreated with 0.5 wt % of a cationic surfactant.
An area with existing turf cover was treated with 0.3 inches of carpet Adhesive Granules and watered. The granules penetrated the soil at the root line, improving percolation and drainage.

Example 7

Carpet Adhesive Granules were pretreated with 0.5 wt % of a cationic surfactant.
An area with existing sparse turf cover was treated with a mixture of 5 weights of Carpet Adhesive Granules and 1 weight of grass seed. Significantly more sprouting of the grass seed resulted in this Treated test plot compared to a similar Control test plot prepared without the benefit of Carpet Adhesive Granules.
At 2 weeks, under dry conditions, the new shoots on the Control plot were withering and the old turf was distressed and yellowed. Both new and old grasses on the Treated plot were healthy and vigorous.

Example 8

An existing arena had been previously treated with chopped fiber to increase the softness of the surface. While successful at first, the benefits of fiber addition declined with time, and the surface began to pack.
A sample of this arena floor material was mixed with Carpet Adhesive Granules in the ratio of 10 parts by weight arena floor material to 2 parts by weight Carpet Adhesive Granules pretreated with surfactant. After watering and mixing, this mixture was judged to have a better surface that obtained previously, immediately after the addition of fiber.

What is claimed is:

1. A method of amending soil to improve porosity and reduce compaction comprising:
   providing a carpet product;
   separating the carpet product into fiber and granules, the granules comprising an organic elastomeric matrix filled with limestone and up to 10 wt % from the carpet product; and
   adding the granules to the soil.

2. The method of claim 1, wherein the granules are added to one or more of an arena, a track, a show grounds, or a field.

3. The method of claim 1, wherein the granules are added to an area which is one or more of existing turf or seeded to grow turf.

4. The method of claim 1, wherein the granules comprise between about 0.1 to about 50 volume percent of the amended soil mixture.

5. The method of claim 1, wherein after separating the carpet product into fiber and granules, screening the granules to remove 50% or more of the granules having a size that is less than about 100 microns such that an average particle size of the granules is in the range of 0.1 millimeters to about 3 millimeters.

6. The method of claim 1, wherein prior to adding the granules to the soil, treating the granules with a cationic, anionic, or non-ionic surfactant.

7. The method of claim 1, wherein prior to adding the granules to the soil, admixing the granules with one or more of a grass seed or a fertilizer blend.

8. The method of claim 1, wherein the granules are used as a carrier for one or more of a fertilizer, a pesticide, a herbicide, or a fragrance.

9. The method of claim 1, wherein following the separation into fiber and granules, the granules are added directly to the soil without treating the granules such that a chemical composition and size of the granules is maintained from the step of separating the carpet product to the step of adding the granules to the soil.

10. The method of claim 1, wherein a minimum granule particle size distribution range of one of the granules is less than a micron.

11. A method of amending soil to improve porosity and reduce compaction comprising:
   providing a carpet product;
   impacting the carpet product with a hammer mill;
   after impacting the carpet product, delivering the carpet product to a screen;
   separating the carpet product into fiber and granules, the granules comprising an organic elastomeric matrix filled with limestone and up to 10 wt % from the carpet product;
   admixing the granules with a grass seed; and then
   adding the granules to the soil.

12. The method of claim 11, wherein the granules comprise between about 0.1 to about 50 volume percent of the amended soil mixture.

13. The method of claim 11, wherein after separating the carpet product into fiber and granules, screening the granules to remove 50% or more of the granules having a size that is less than about 100 microns.

14. The method of claim 11, wherein prior to adding the granules to the soil, treating the granules with a cationic, anionic, or non-ionic surfactant.

15. The method of claim 11, wherein the granules are used as a carrier for one or more of a fertilizer, a pesticide, a herbicide, or a fragrance.

16. A method of amending soil to improve porosity and reduce compaction comprising:
   providing a carpet product;
   impacting the carpet product with a rotary impact separator, the rotary impact separator comprising a housing within which a blunt force instrument, attached to a shaft, is positioned, the rotary impact separator configured to receive the carpet product within the housing and impact the carpet product with the blunt force instrument;
   separating the carpet product into fiber and granules; and
   adding the granules to the soil.

17. The method of claim 16, wherein the granules comprise between about 0.1 to about 50 volume percent of the amended soil mixture.

18. The method of claim 16, wherein after separating the carpet product into fiber and granules, screening the granules to remove 50% or more of the granules having a size that is less than about 100 microns.

19. The method of claim 16, wherein prior to adding the granules to the soil, one or more of:
   treating the granules with a cationic, anionic, or non-ionic surfactant; or
   admixing the granules with one or more of a grass seed or a fertilizer blend.

20. The method of claim 16, wherein the granules are used as a carrier for one or more of a fertilizer, a pesticide, a herbicide, or a fragrance.

* * * * *